3,130,643
ENGRAVING AND COPYING MACHINE
Roland Heinelt, Munich, Germany, assignor to Hans
  Deckel, Munich, Germany, and Friedrich Wilhelm
  Deckel, Zug, Switzerland
  Filed Oct. 22, 1962, Ser. No. 232,225
Claims priority, application Germany Oct. 30, 1961
10 Claims. (Cl. 90—13.1)

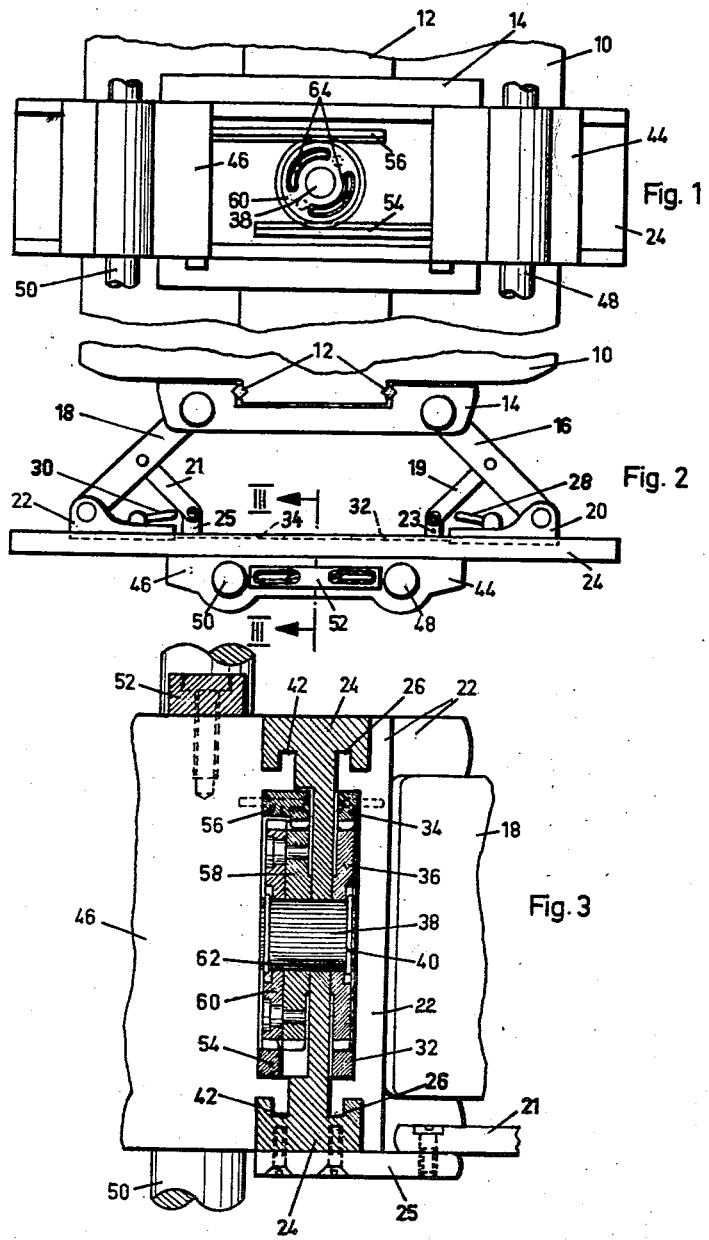

This invention relates broadly to engraving and copying machines and more particularly to an engraving and copying machine wherein the tool and the copying pin are arranged for movement in a slide which is displaceable on a carrier beam guided parallel to itself.

Prior art machines, of the type contemplated herein, have as a connection of the carrier beam with the machine frame two parallel guides of equal length which give the carrier beam a parallel guidance on an arc. For the movement of the tool slide in two cordinates, which ultimately is the important thing, only those components of this circular motion of the carrier beam become usable which lie at right angles to the tool slide guidance, while the movement components lying in the direction of the slide guidance are compensated by appropriate displacements of the tool slide on the carrier beam. If one sets aside what maximal right-angle working area is achievable for the tool and the copying pin or stylus, then the parallel guidance of the carrier beam described by means of two parallel guides proved to be not particularly advantageous, because it requires a length equal to the carrier beam increased by the unused components of the carrier beam motion. This as a disadvantage is opposed to the advantages which in themselves are connected with the use of a steering guidance instead of a likewise familiar straight line slide guidance of the carrier beam.

In addition, in other type copying machines, it has been proposed to mount the carrier beam on the machine frame by means of two pairs of guide arms hinged to an intermediate piece, in the form of a double parallelogram. The more favorable utilization of the length of the carrier with respect to the working area, however, is here achieved with a rather considerable expense, due to the complexity of the double parallelogram mechanism.

The connection between the machine frame and carrier beam of another copying machine, accomding to a further proposal, consists of two carriages arranged in mirror image manner to the middle of the carrier beam, with each carriage provided with a pair of parallel guides. The carriages slide oppositely from each other in a slide path and are guided by the double guide parallel to the carrier beam. The length of the slide path, in this type arrangement, corresponds to the length of the work area of the tool increased by twice the length of the guides. According to the copying machine of the present invention, the carrier beam is likewise attached to the machine frame by means of two carriages, but these carriages are provided with only one guide arm each and are guided oppositely and symmetrically to the middle plane of a slide path disposed parallel to the pivoting plane of the guide arms, and for this purpose carry on their ends which are turned toward each other a rack gear each, disposed parallel to the slide path, with the racks disposed in mesh with diametrically opposite points on a reversible gear which is mounted on the slide path. This design has the advantage that the length of the slide path now conforms only to the length of the guides. To provide working area of the tool in the longitudinal direction, the tool slide is displaceable in its guide on the carrier beam. The carrier beam itself is not only guided parallel to itself but as a result of the mounting of the reversible gear on the slide path, it is guided in a straight line and at right angles to the displacement direction of the slide. The conditions are thus similar to those with the above mentioned slide guidance of the carrier beam in a slide path at right angles to the slide guidance.

In a preferred embodiment of the invention, as shown in the drawings, the slide path for the two carriages lies on the carrier beam and the free or inner ends of the guide arms are mounted on the machine. Thereby a carrier beam results which is provided with two slide guidances, which preferably are parallel to each other and enable more to be produced on the same workpiece, more simply and precisely than can be produced on two workpieces separated from each other.

The straight line guidance of the carrier beam proves to be especially advantageous when a mirror-image copying device is to be formed by the copying machine. That is, it is then possible for this mechanism, with the reversible gear on the carrier itself, in place of the tables for pattern and workpiece, to guide the tool and the copying stylus oppositely. With a machine of this sort, according to a further characteristic of the invention, the slide is constructed in such a way in two parts that one slide member contains the tool and the other slide member the copying pin or sylus, and the slide members each carry on their sides, which are turned toward each other, a rack gear disposed parallel to the slide guidance and which mesh at diametrical points into two cogwheels, non-rotatively connected with each other. The coupling of the two cogwheels results in the opposite movement of the two slide members on their guide and thus opposite movement of the tool and the copying pin for mirror-image copying. With the cogwheels disposed in uncoupled relation identical movement of the slide members for identical copying is possible. With this arrangement the slide members are expediently connected to each other by means of a removable fishplate.

In order that the slide members can be adjusted asymmetrical to the middle of the carrier beam or to the middle of the pattern and workpiece, when the mechanism is connected for mirror-image copying, the cogwheels are provided with means enabling them to be coupled with each other in any desired relative position.

Therefore, one of the objects of the invention is to provide a construction of engraving and copying machine in which the length of the tool slide path conforms only to the length of the carrier beam connecting guide.

Another object of the invention is to provide a novel construction of engraving and copying machine which can be easily and quickly converted for either identical or mirror-image copying.

A further object of the invention is to provide a construction of engraving and copying machine which is economical to manufacture and which provides fewer interconnecting guide arms than in previous constructions.

Still a further object of the invention is to provide a construction of engraving and copying machine in which there is substantially less mass to be moved as compared with previous constructions, thus making the machine easily adaptable for manual control.

Other and further objects of the invention lie in the manner in which the slide members are coupled to the carrier beam and the manner in which the carrier beam is connected to the machine frame for parallel and straight-line guidance as set forth more fully in the specification hereinafter following by reference to the accompanying drawings, in which:

FIG. 1 is a fragmentary front elevational view of the engraving and copying machine of the invention, showing the mechanism set up for mirro-image copying and only partly showing the machine frame;

FIG. 2 is a top plan view of the machine of FIG. 1, but showing the machine set up for identical copying; and FIG. 3 is an enlarged fragmentary cross-sectional view taken substantially along line III—III of FIG. 2.

Referring to the drawings in greater detail—reference numeral 10 designates the frame of the copying machine and only a fragmentary portion of the frame has been shown in the drawings since it is of conventional design and well known in the art. Machine frame 10 carries the vertical guide 12 thereon, on which the vertical carriage 14 is slidably guided by means of roller bearings or the like, in conventional manner. The weight of vertical carriage 14 and the parts attached thereto is compensated in familiar manner, such as by a counterweight or the like, to make the same easily slidable along vertical guide 12.

A pair of guide arms 16 and 18 are pivoted at one end to opposite ends of vertical carriage 14, and have their opposite ends pivotally connected to horizontally slidable carriages 20 and 22, respectively. As shown more particularly in FIGS. 2 and 3, longitudinally extending slide paths or slide recesses 26 are provided on one longitudinal face of carrier beam 24 and the horizontally slidable carriages 20 and are slidably engaged in the slide paths 26 and are arranged to be clamped or locked at selected positions therein by means of the toggle locks 28 and 30, respectively, of conventional design and having a portion extendible into engagement with carrier 24. A pair of intermediate guide arms 19 and 21 are pivoted at one end to the bottom portions of guide arms 16 and 18, respectively at positions intermediate their ends, and at their opposite ends are pivotally connected to plates 23 and 25, respectively, which are rigidly connected to the bottom portion of carrier 24.

A bearing 38 is rigidly connected to carrier 24 centrally thereof and extends outwardly of opposite longitudinal faces of the carrier as shown in FIG. 3. A reversibly rotatable gear 36 is journaled for rotation on one end of bearing 38, intermediate the slide paths 26 and is held thereon by a retainer ring 40 connected to the bearing. A pair of rack gears 32 and 34 are respectively connected to carriages 20 and 22 and are disposed to extend longitudinally parallel to each other and the slide paths 26 into meshing engagement with reversibly rotatable gear 36 at diametrically opposite points, in the same manner as illustrated in FIG. 1 with respect to racks 54 and 56 to be described.

This mechanism thus effects a straightline guidance of the carrier 24 toward and away from the carriage 14, in positions parallel to itself in a lateral direction at right angles to the longitudinal slide paths 26, and at all times the slide path is maintained parallel to the pivoting planes of the guide arms 16 and 18, due to the arrangement of the intermediate guide arms 19 and 21 and the rack gear mechanism 32, 34 and 36.

In a manner similar to the connection of horizontal carriages 20 and 22 with carrier 24, a pair of slide members 44 and 46, having provision for carrying a copying pin or stylus 48 and cutting tool 50, respectively, are connected for horizontal displacement in a longitudinal guide 42 carried by the face of carrier 24 which is opposite from the carrier face on which slide paths 26 are provided. In normal operation, a model or pattern is placed under the stylus 48 and a workpiece to be cut according to the model is placed under the tool 50. The longitudinal guide 42 is thus disposed in parallel relation to the slide paths 26, and the slide members 44 and 46 are horizontally shiftable therein.

In FIGS. 2 and 3 the slide members 44 and 46 are shown shifted inwardly toward each other on carrier 24 in abutting relation and joined together as a unit by means of the removable fishplate 52 connected thereto by screws or the like. When joined in this manner, the stylus 48 and tool 50 move in unison in the same directions so as to produce from the workpiece, under tool 50, an identical copy of the model under the stylus 48. Elongated slots or the like are provided in fishplate 52 so that slide members 44 and 46 may be joined together as a unit in spaced-apart relation to accommodate different sizes of workpieces and models.

In FIG. 1, the fishplate 52 is shown removed from slide members 44 and 46 with the slide members shown shifted oppositely outwardly on carrier 24. Slide member 44 is provided with rack gear 54 connected thereto and slide member 46 is provided with rack gear 56 connected thereto, with the rack gears disposed parallel to each other and extending longitudinally parallel with guide 42. A pair of gears or cogwheels 58 and 60 are journaled for separate rotation on bearing 38, intermediate the rack gears 54 and 56, and are retained on the bearing by means of retainer ring 62, with cogwheel 58 extending into meshing engagement with rack gear 56 above bearing 38 and cogwheel 60 extending into meshing engagement with rack gear 54 below bearing 38. With movement in unison of the slide members 44 and 46 in carrier guide 42, when these members are joined as a unit by fishplate 52, as shown in FIGS. 2 and 3, the cogwheels 58 and 60 rotate counter to each other on bearing 38 and thus enable tool 50 to trace an identical path with stylus 48 to thus provide an identical copying mechanism.

However, if the cogwheels 58 and 60 are rigidly coupled together, by means of screw 64 or the like, to simultaneously rotate in the same direction as indicated in FIG. 1, then the slide members 44 and 46 and thus the stylus 48 and tool 50 carried thereby move counter to each other upon the movement of either slide member, so that a mirror-image path of the stylus movement is traced by the tool, enabling the production of a mirror-image workpiece from a pattern or model under the stylus. It can, therefore, be seen that the copying machine of the invention can be operated in two different modes.

While I have described my invention in certain preferred embodiments, I realize that modifications can be made and I desire that it be understood that no limitations upon my invention are intended other than those which may be imposed by the scope of the appended claims.

What I claim as new and desire to secure by Letters Patent of the United States is as follows:

1. An engraving and copying machine comprising, machine frame means, a movable carrier member providing a longitudinal slide path thereon, a pair of carriages slidably engaged in said longitudinal slide path, a guide arm pivotally connecting each carriage of said pair with machine frame means, a rack extending parallel to said longitudinal slide path connected to each carriage of said pair of carriages, a gear journaled on said carrier member in said slide path and meshing at diametrical points with said rack of each carriage whereby said pair of carriages are oppositely and symmetrically slidable in said longitudinal slide path parallel to the pivot plane of the guide arms for laterally guiding said carrier member to selected positions parallel to itself, a tool and a copying pin, and slide means carrying said tool and copying pin connected to said movable carrier member for guided relative longitudinal displacement thereon.

2. An engraving and copying machine as set forth in claim 1, and locking means connected to at least one of said carriages of said pair for clamping the carriage in set position in said longitudinal slide path.

3. An engraving and copying machine as set forth in claim 1 in which said longitudinal slide path is disposed parallel to the displacement guidance path of said slide means on said carrier member.

4. An engraving and copying machine as set forth in claim 1 in which said slide means comprises a pair of slide members, one of said slide members having said tool connected thereto and the other of said slide members carrying said copying pin, and means connecting said pair of slide members for longitudinal displacement on said carrier member in unison.

5. An engraving and copying machine as set forth in claim 1 in which said slide means comprises a pair of slide members, one of said slide members having said tool connected thereto and the other of said slide members carrying said copying pin, and means interconnecting said pair of slide members for opposite symmetrical longitudinal displacement thereof on said carrier member.

6. An engraving and copying machine as set forth in claim 4, in which said means connecting said pair of slide members includes, a pair of gears coaxially mounted for separate rotation on said carrier member, a rack connected with each slide member and extending parallel to the displacement path of said slide members on said carrier member, said rack of one slide member meshing with one gear of said pair of gears and said rack of the other slide member meshing with the other gear of said pair of gears at diametrical points on said gears.

7. An engraving and copying machine as set forth in claim 6 in which said means connecting said pair of slide members further includes a removable plate rigidly joining said pair of slide members.

8. An engraving and copying machine as set forth in claim 5, in which said means interconnecting said pair of slide members includes gear means mounted for rotation on said movable carrier member, a pair of racks extending parallel to the displacement path of said slide members on said carrier member respectively connected with said pair of slide members and meshed at diametrical points with said gears means whereby longitudinal displacement of one of said slide members along said carrier member provides an opposite and symmetrical longitudinal displacement of the other of said slide members along said carrier member.

9. An engraving and copying machine as set forth in claim 8 in which said gear means comprises a pair of gears coaxially journaled on said carrier member and nonrotatively connected relative to each other.

10. An engraving and copying machine comprising, machine frame means, a movable carrier member providing a longitudinal slide path thereon, a pair of carriages slidably engaged in said longitudinal slide path, a pair of guide arms pivotally connecting said pair of carriages with said machine frame means, gearing interconnecting said pair of carriages and said carrier member for opposite and symmetrical longitudinal movement of said pair of carriages in said longitudinal slide path, said slide path disposed parallel to the plane of the pivot connections of said pair of guide arms for guiding said movable carrier member laterally to selected positions parallel to itself, a tool and a copying stylus, and slide means carrying said tool and copying stylus connected for longitudinal displacement on said carrier member.

References Cited in the file of this patent
UNITED STATES PATENTS

| | | |
|---|---|---|
| 2,666,366 | Zwick | Jan 19, 1954 |
| 2,831,405 | Sallwey et al. | Apr. 22, 1958 |
| 2,858,743 | Sallwey | Nov. 4, 1958 |
| 2,962,942 | Laurent | Dec. 6, 1960 |